United States Patent [19]

Oshima et al.

[11] Patent Number: 4,902,954

[45] Date of Patent: Feb. 20, 1990

[54] ALTERNATING CURRENT MOTOR CONTROL APPARATUS

[76] Inventors: Kenji Oshima, 5-4-3-203 Karabe, Narita-shi, Chiba-ken 286; Yasutami Kito, 715 Aza Ochiai, Oaza Ochiai, Haruhimura, Nishikasugai-gun, Aichi-ken 452, both of Japan

[21] Appl. No.: 196,199

[22] PCT Filed: Aug. 21, 1987

[86] PCT No.: PCT/JP87/00623

§ 371 Date: Jun. 6, 1988

§ 102(e) Date: Jun. 6, 1988

[87] PCT Pub. No.: WO88/01450

PCT Pub. Date: Feb. 25, 1988

[30] Foreign Application Priority Data

Aug. 22, 1986 [JP] Japan ................. 61-197569

[51] Int. Cl.$^4$ ............... H02P 3/18; H02P 5/40
[52] U.S. Cl. ................. 318/762; 318/798; 318/806
[58] Field of Search ........... 157/119; 318/798, 806, 318/778, 759, 762

[56] References Cited

U.S. PATENT DOCUMENTS

| | | | |
|---|---|---|---|
| 3,781,616 | 12/1973 | Mokrytzki et al. | 318/801 |
| 3,829,757 | 8/1974 | Frank et al. | 318/722 |
| 4,051,418 | 9/1977 | O'Berto et al. | 318/759 |
| 4,319,177 | 3/1982 | Kawada et al. | 318/798 |
| 4,445,167 | 4/1984 | Okado | 318/811 |
| 4,545,464 | 10/1985 | Nomura | 187/119 |
| 4,642,546 | 2/1987 | Schonherr | 318/798 |
| 4,678,063 | 7/1987 | Kitaoka et al. | 187/119 |
| 4,678,980 | 7/1987 | Sugimoto et al. | 318/759 |
| 4,761,600 | 8/1988 | D'Atre et al. | 187/119 |

*Primary Examiner*—David Smith, Jr.

[57] ABSTRACT

An apparatus for controlling an adjustable-speed alternating current motor coupled to drive an elevator cage. The apparatus includes a converter connected to a source of AC power for converting the AC power into DC power, an inverter connected through relatively positive and negative conductors to the converter for inverting the DC power into DC output power having adjustable frequency, voltage magnitude, and current magnitude to drive the motor, and a control circuit for controlling an inverter to drive the motor at an adjustable speed. When a power failure occurs, the control circuit prevents flow of power through the converter to the power source and reduces the current magnitude of the inverter output power to a predetermined minimum limit enough to maintain a synchronous relationship between the inverter and the motor. When the power failure continues for a predetermined time, an electric resistor is connected between the relatively positive and negative conductors to provide a dynamic braking of the motor.

4 Claims, 2 Drawing Sheets

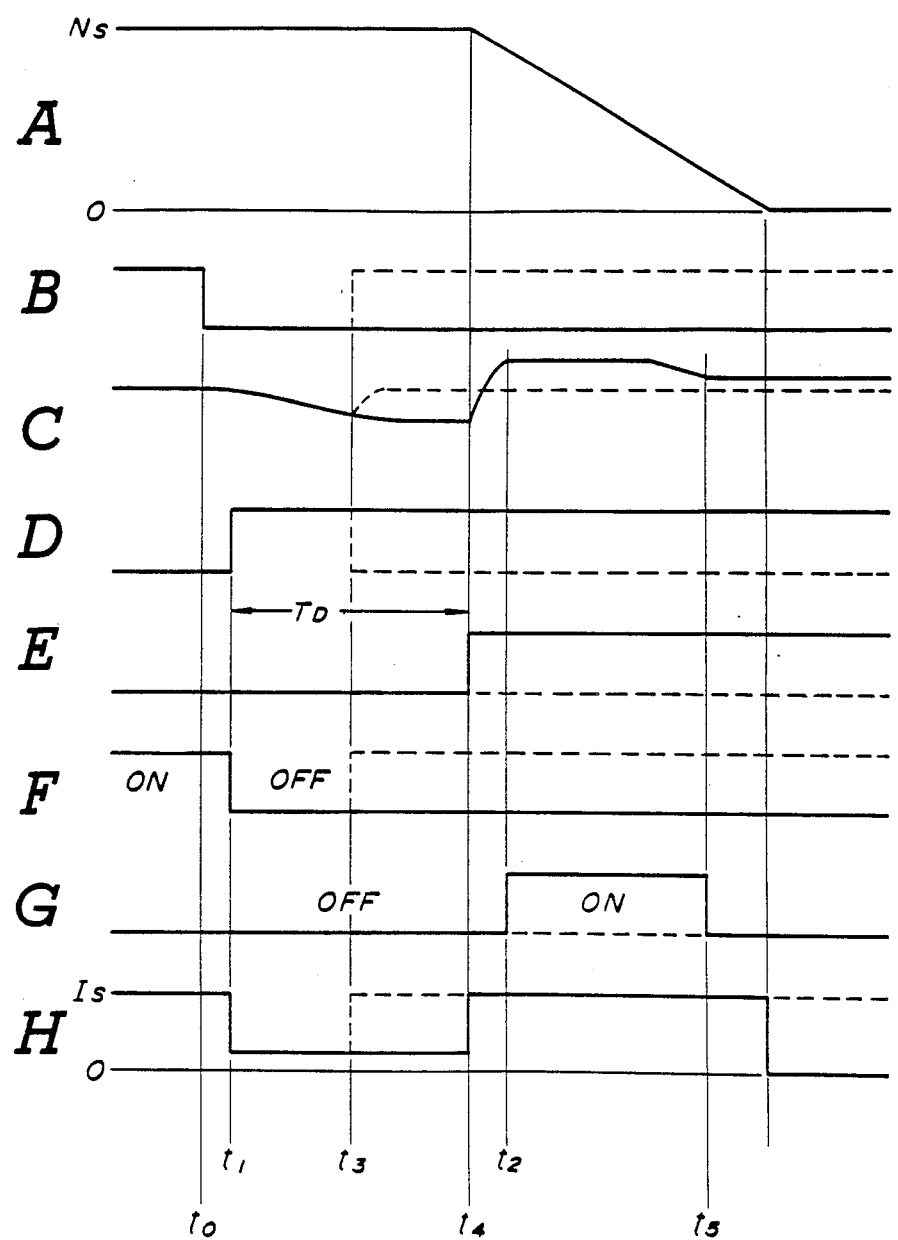

ALTERNATING CURRENT MOTOR CONTROL APPARATUS

BACKGROUND OF THE INVENTION

This invention relates to an apparatus for controlling an adjustable-speed alternating current (AC) motor coupled to drive an elevator cage.

Electric power converters or inverters have been employed for the application of adjustable-speed drives using alternating current motors. A typical converter includes a direct current (DC) rectifier for rectifying three-phase AC input voltage and for supplying the resulting DC bus potential to an inverter. The inverter comprises a plurality of pairs of series-connected switching elements to generate an adjustable frequency output. In many applications, such a frequency adjustment is effected through a control circuit which employs a pulse width modulation (PWM) control technique in producing variable frequency gating pulses to periodically switch the respective switching elements so as to operate the AC motor at a variable speed. The AC motor can be propelled (motoring mode) or retarded (braking mode) as desired by appropriately varying the frequency and the amplitude of the excitation that the inverter applies to the AC motor. The AC motor operation is changed frequency between the motoring and braking modes particularly when the AC motor is used to drive an elevator. It is necessary to flow power from the AC motor back through the inverter to the converter during the braking mode or other regenerative conditions in order to operate the AC motor with high efficiency.

It is the conventional practice to bring the elevator to a stop by applying a mechanical braking while stopping the inverter operation when a power failure occurs. However, this requires a large-sized mechanical braking system which can absorb the whole inertia energy of the elevator. This is true particularly for large-sized and high-speed elevators. In addition, there is no way to handle the regenerated power when the regenerative function is inhibited in response to the power failure.

SUMMARY OF THE INVENTION

There is provided, in accordance with the invention, an apparatus for controlling an adjustable-speed alternating current motor coupled to drive an elevator cage. The apparatus includes a converter connected to a source of AC power for converting the AC power into DC power, and an inverter connected through relatively positive and negative conductors to the converter for inverting the DC power into AC output power having adjustable frequency, voltage magnitude and current magnitude to drive the motor. The converter includes regeneration means controlled to permit flow of power from the inverter to the power source during regenerative conditions. The apparatus also includes a control circuit for controlling the inverter to drive the motor at an adjustable speed. The control circuit includes means responsive to a power failure for disabling the regeneration means to prevent flow of power to the power source and reducing the current magnitude of the inverter output power to a predetermined minimum limit enough to maintain a synchronous relationship between the inverter and the motor. The control circuit includes means for connecting an electric resistor between the relatively positive and negative conductors to provide a dynamic braking of the motor after the power failure continues for a predetermined time.

BRIEF DESCRIPTION OF THE DRAWINGS

This invention will be described in greater detail by reference to the following description taken in connection with the drawings, in which:

FIG. 2A-2H are graphic illustrations used in explaining the operation of the invention.

DETAILED DESCRIPTION OF THE INVENTION

Figure 1:
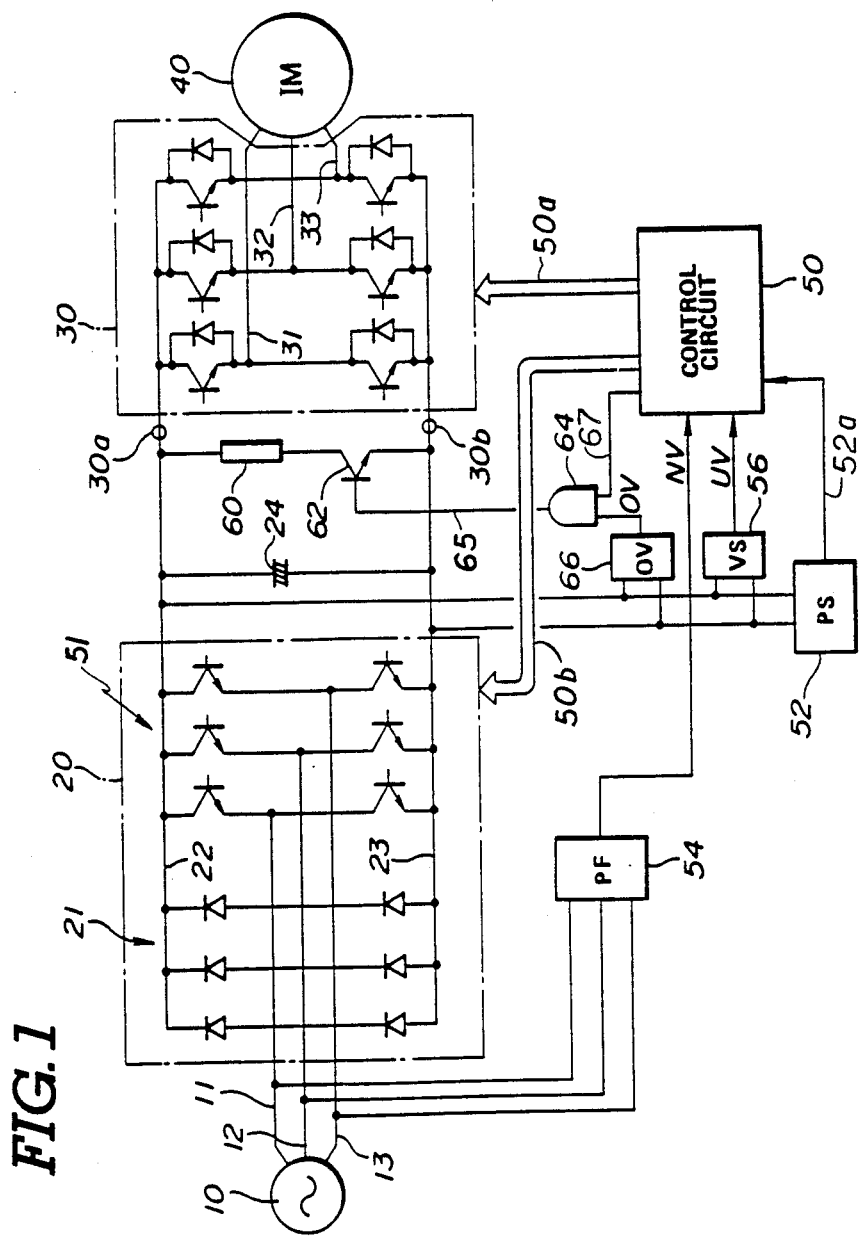
FIG. 1 is a schematic block diagram showing one embodiment of an alternating current motor control apparatus made in accordance with the invention.

With reference now to the drawings, and particularly to FIG. 1, a converter system 20 includes input conductors 11, 12 and 13 for receiving electric power from a suitable three-phase AC power source 10 The input conductors 11, 12 and 13 carry this power to a three-phase power rectifier 21 which is operative to convert alternating voltage to unipolarity voltage for energizing a DC link shown as the relatively positive conductor 22 and the relatively negative conductor 23. The power rectifier 21 is shown as including a plurality of parallel pairs of series-connected diodes. A capacitor 24 spans the DC link for smoothing the rectified power. The unipolarity voltage across the smoothing capacitor 24 is applied to respective DC input terminals 30a and 30b of a power inverter 30. The inverter 30 is shown as including a plurality of parallel pairs of series-connected power transistors arranged and controlled to convert the DC input power into three-phase AC output power having adjustable frequency and voltage magnitude. For this purpose, each of the power transistors has its base or controlled electrode coupled to a control circuit 50 which will supply the power transistors with cyclic gate pulses to turn on the power transistors in a predetermined sequence and at a desired frequency. The power transistors may be replaced with silicon controlled rectifiers or other switching elements to obtain the same result. The three-phase AC output is supplied through output conductors 31, 32 and 33 to a three-phase induction motor 40 which is used to drive an elevator passenger cage (not shown).

The induction motor 40 can be propelled (motoring mode) or retarded (braking mode) as desired by appropriately varying the frequency and the amplitude of the excitation that the inverter 30 applies to the induction motor 40. For this purpose, the control circuit 50 regulates and controls the operation of the inverter 30 in programmed response to a plurality of input signals which may comprise a signal representing the desired motor speed and a feedback signal representative of the actual motor speed. The control circuit 50 utilizes a pulse width modulation (PWM) control technique to produce gating pulses on a line 50a so as to periodically switch the respective power transistors of the inverter 30 in accordance with a speed pattern programmed into the control circuit 50.

During the normal operation of the inverter 30, the flow of energy is from the converter system 20 through the inverter 30 to the induction motor 40. However, during regenerative conditions, power may flow from the induction motor 40, which is now acting an energy source, back through the inverter 30 to charge the capacitor 24.

The inverter 30 includes feedback diodes each connected across the corresponding power transistor in inverse parallel relationship therewith for passage of current regenerated in the induction motor 40 to charge the capacitor 24, for example, during an induction motor braking mode. Additionally, the converter system 20 also includes a plurality of parallel pairs of series-connected power transistors 51 arranged and controlled to feed the regenerated current to the AC power source 10. For this purpose, each of the power transistors has its base or controlled electrode coupled by means of a line 50b to the control circuit 50. These power transistors may be replaced with silicon controlled rectifiers or other switching elements to obtain the same result.

The control circuit 50 operates on regulated DC power supplied from a constant-voltage regulated power source (PS) 52 which is supplied on a line 52a with DC power from the converter system 20. The control circuit 50 receives inputs from various detection circuits including a power failure detection circuit (PF) 54 and a voltage shortage detection circuit (VS) 56. The power failure detection circuit 54 has three inputs connected to the respective input conductors 11, 12 and 13 for producing a power failure indication signal NV when a power failure such as power interruption, open-phase, or the like occurs. The voltage shortage detection circuit 56 has two inputs connected to the respective positive and negative conductors 22 and 23 for producing a voltage shortage indication signal UV when a voltage drop appears in the AC power source 10 or the inverter system 20. These signals NV and UV are applied to the control circuit 50.

As shown in FIG. 1, the smoothing capacitor 24 is connected in parallel with a braking resistor 60 which is connected in series with a power transistor 62. The power transistor 62 has a base or controlled electrode connected on a line 65 to the output of an AND gate 64. The AND gate 64 has an input connected to the control circuit 50 and another input connected to an overvoltage detection circuit (OV) 66. The overvoltage detection circuit 66 has two inputs connected to the positive and negative conductors 22 and 23 for producing an overvoltage indication signal OV in the form of a high-level signal to the AND gate 64 when an overvoltage appears at the output of the converter system 20. It is to be noted, of course, that the power transistor 62 may be replaced with a silicon controlled rectifiers or other switching elements.

In response to the power failure indication signal NV or the voltage shortage indication signal UV, the control circuit 50 carries out the following controls. First, the control circuit 50 controls the power transistors of the converter system 20 to interrupt the regenerated current flow to the AC power source 10. This is effective to protect the power transistors from breakage due to excessive current flow caused when a power failure occurs during a regenerative condition. Second, the control circuit 50 controls the inverter 30 to reduce its output current to a predetermined minimum limit enough to maintain the synchronous relationship between the inverter 30 and the induction motor 40. This is effective to maintain the induction motor running while minimizing the DC voltage drop across the conductors 22 and 23 so as to facilitate the resumption of the induction motor operation after removal of the power failure. Third, the control circuit 50 produces a high-level signal to open the AND gate 64. The output of the AND gate 64 changes to its high level turning on the power transistor 62 so as to connect the braking resistor 60 across the capacitor 24 when the overvoltage detection circuit 66 produces an overvoltage indication signal OV. This is effective to protect the power transistors and the capacitor 24 from breakage due to excessive current flow caused after the regenerated current flow is interrupted.

The operation of the invention may be better understood by referring to FIGS. 2A to 2H. It is assumed that a power failure occurs at time t0, as shown, in FIG. 24, during the normal operation where the control circuit 50 controls the inverter 30 to operate the induction motor 40 at a target speed Ns, as shown in FIG. 2A. At time t1, the power failure detection circuit 54 or the voltage shortage detection circuit 56 produces a signal indicative of the power failure to the control circuit 50, as shown in FIG. 2D. In response to this failure indication signal, the control circuit 50 turns off the power transistors 51 of the converter system 20 to prevent regenerated current flow to the AC power source 10, as shown in FIG. 2F, controls the inverter 30 to reduce the output current to the induction motor 40 to a predetermined minimum limit enough to maintain the synchronous relationship between the inverter 30 and the induction motor 40, as shown in FIG. 2H, and produces a high-level signal on a line 67 to open the AND gate 64. It is to be noted that the output of the AND gate 64 remains low (as shown in FIG. ) until the overvoltage detection circuit 66 produces an overvoltage indication signal OV at time t2.

The power failure continues for a predetermined time $T_D$, for example, several tenths of seconds, the control circuit 50 confirms the power failure, as shown in FIG. 2E, at time t4 and controls the inverter 30 to operate the induction motor 40 at a decreasing speed, as shown in FIG. 2A, while at the same time permitting the DC voltage to increase, as shown in FIG. 2C. Under this control, current will flow from the induction motor 40 through the inverter 30 to charge the capacitor 24, causing an excessive voltage across the conductors 22 and 23. The overvoltage detection circuit 66 detects this excessive voltage and generates the overvoltage indication signal OV. Since the AND gate 64 has thus been opened, the overvoltage indication signal OV changes the output of the AND gate 64 to its high level turning on the power transistor 62 to connect the braking resistor 60 across the capacitor 24. Under this condition, the braking resistor 60 serves to provide a dynamic braking so as to slow down the induction motor 40 and reduce the regenerated current. At time t5 when the voltage across the conductors 22 and 23 drops below a predetermined level, the overvoltage detection circuit 66 stops generating the overvoltage indication signal OV and turns off the power transistor 62 so as to release the dynamic braking. Thereafter, a mechanical braking is used to bring the elevator to stop.

It is to be noted that, during the period between time t1 and time t4, the inverter 30 operates in a normal manner except for its output current being at a predetermined minimum limit. Assuming now that the power failure is eliminated or diminished at time t3 which is prior to time t4, as shown by the broken line, of FIG. 2B, the power failure indication signal is eliminated or diminished at time t3, as shown by the broken line of FIG. 2D, and thus, the control circuit 50 controls the inverter 30 to return its output current to its initial magnitude, as shown by the broken line of FIG. 2H, and turns on the power transistors of the converter system 20 to permit flow of regenerated current to the AC power source 10, as shown by the broken line of FIG. 2F. In addition, the control circuit 50 holds the AND gate 64 closed to prevent the dynamic braking function of the braking resistor 60, as shown by the broken line of FIG. 2G.

As described previously, the control circuit 50 is responsive to a power failure for stopping the regeneration function and reducing the inverter output current to a predetermined minimum level enough to maintain a synchronous relationship between the inverter 30 and the induction motor 40. If the power failure is eliminated or diminished within the predetermined time $T_D$, the control circuit 50 returns the inverter 30 to its normal operation mode. Otherwise, the control circuit 50 commands application of a dynamic braking of the induction motor 40. If a power failure occurs during a regenerative condition, the overvoltage detector 66 will produce an overvoltage indication signal to start the application of the dynamic braking of the induction motor before the lapse of the time $T_D$ so that the induction motor 40 can come to a stop.

After the power failure continues for a predetermined time, the control circuit 50 controls the inverter 30 to operate the induction motor 40 at a decreasing speed by gradually decreasing the speed command signal Ns which is obtained from a speed pattern. However, such control may be made by decreasing the inverter output current to maintain the induction motor 40 at a constant torque. In addition, the control circuit 50 may be arranged to control the inverter 30 to increase the induction motor speed again so that the inverter can return to its normal operation or to restart the induction motor after it is stopped when the power supply is resumed after the power failure continues for the predetermined time. These control patterns can be realized merely be modifying the speed pattern. Another control pattern may be employed to provide a motoring torque required to bring the elevator passenger cage to the nearest floor after the power failure continues for the predetermined time.

It is apparent from the foregoing that there has been provided, in accordance with the invention, an alternating current motor control apparatus which permits the motor to operate in a normal manner without any speed reduction in the event of a power failure which diminished within a predetermined time. After the power failure continues for the predetermined time, the motor is decelerated by a dynamic braking in the early stage of the motor braking mode and a mechanical braking is employed in the subsequent stage of the motor braking mode. This is effective to ensure that the elevator comes to a stop safely. In addition, this permits the use of a compact mechanical braking system having a relatively small braking force.

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. An apparatus connected to a source of fixed frequency alternating current (AC) for providing a motor control signal for controlling the speed of an AC motor coupled to drive an elevator cage, comprising:

a converter connected to the source of AC having rectifier means for converting the AC into direct current (DC);

an inverter connected through relatively positive and negative conductors to the converter, responsive to the motor control signal, for inverting said DC into AC having adjustable frequency to drive the motor and for providing regenerative power from the motor during regenerative conditions;

AC power failure detector means, responsive to the fixed frequency AC power source for detecting a power failure and for providing a power failure signal;

overvoltage detector means, responsive to the voltage between said positive and negative conductors, for providing an overvoltage signal upon detecting said voltage exceeding a selected magnitude;

said converter further comprising regenerative power switching means responsive to a regenerative power control signal for controlling the flow of said regenerative power from said inverter to the fixed frequency AC source during said regenerative conditions;

an electric resistor responsive to said regenerative power for dissipation thereof; and a control circuit for providing the motor control signal for controlling said inverter for driving the motor at a selected speed, said control circuit responsive to said power failure signal for providing said regenerative power control signal for controlling said regeneration means to prevent flow of regenerative power to the power source, said control circuit for providing said motor control signal for reducing the current magnitude of said inverter output power to a predetermined minimum limit enough to maintain a synchronous relationship between said inverter and the motor, said control circuit further comprising means responsive to said power failure signal and said overvoltage signal for connecting said electric resistor between said relatively positive and negative conductors to provide a dynamic braking of the motor in the simultaneous presence of said overvoltage signal and said power failure signal after said power failure signal has persisted for a predetermined time.

2. The apparatus as claimed in claim 1, wherein said control circuit includes means for discontinuing said providing of said motor control signal to reduce the current magnitude of said inverter output power to a predetermined minimum limit after said power failure continues for said predetermined time.

3. The apparatus as claimed in claim 1, wherein said control circuit further comprises means responsive to said failure signal for controlling the inverter to drive the electric motor at a decreasing speed after said power failure signal continues for said predetermined time.

4. The apparatus as claimed in claim 1, wherein said power failure detector further comprises a undervoltage detector connected between the relatively positive and negative conductors for providing a second power failure signal when the voltage between the relatively positive and negative conductors drops below a predetermined value, said control circuit responsive to said second power failure indication signal for providing said regenerative control signal for turning off said regenerative power switching means and for providing said motor control signal for reducing the current magnitude of said inverter output power to said predetermined minimum limit.

* * * * *

UNITED STATES PATENT AND TRADEMARK OFFICE
CERTIFICATE OF CORRECTION

PATENT NO.   :   4,902,954
DATED        :   February 20, 1990
INVENTOR(S)  :   Kenji Oshima et al It is certified that error appears in the above-identified patent and that said Letters Patent is hereby corrected as shown below:

| Column | Line No. | |
|---|---|---|
| 1 | 28 | Change "frequency" to --frequently--; |
| 2 | 7 | Before "drawings", insert --accompanying--; |
| 2 | 19 | After "power source 10", insert --.--; |
| 2 | 66 | After "acting", insert --as--; |
| 3 | 47 | Delete "with a"; substitute --with--; |
| 4 | 10 | Delete "FIG. 24"; substitute --FIG. 2B--; |
| 4 | 28 | Delete "FIG. )"; substitute --FIG. 2G)--; |
| 4 | 30 | Delete "t2"; substitute --$t_2$--; |
| 4 | 34 | Delete "t4"; substitute --$t_4$--. |

TITLE PAGE:
In the Abstract

Line 7    Delete "DC power into DC output power" and substitute --DC power into AC output power--.

Signed and Sealed this

Twenty-fifth Day of August, 1992

*Attest:*

DOUGLAS B. COMER

*Attesting Officer*   *Acting Commissioner of Patents and Trademarks*